Oct. 13, 1931.    M. J. HUGGINS    1,827,525
ELECTRIC LIQUID MEASURING AND INDICATING MEANS
Filed Sept. 11, 1926    4 Sheets-Sheet 1

Oct. 13, 1931.  M. J. HUGGINS  1,827,525
ELECTRIC LIQUID MEASURING AND INDICATING MEANS
Filed Sept. 11, 1926   4 Sheets-Sheet 2
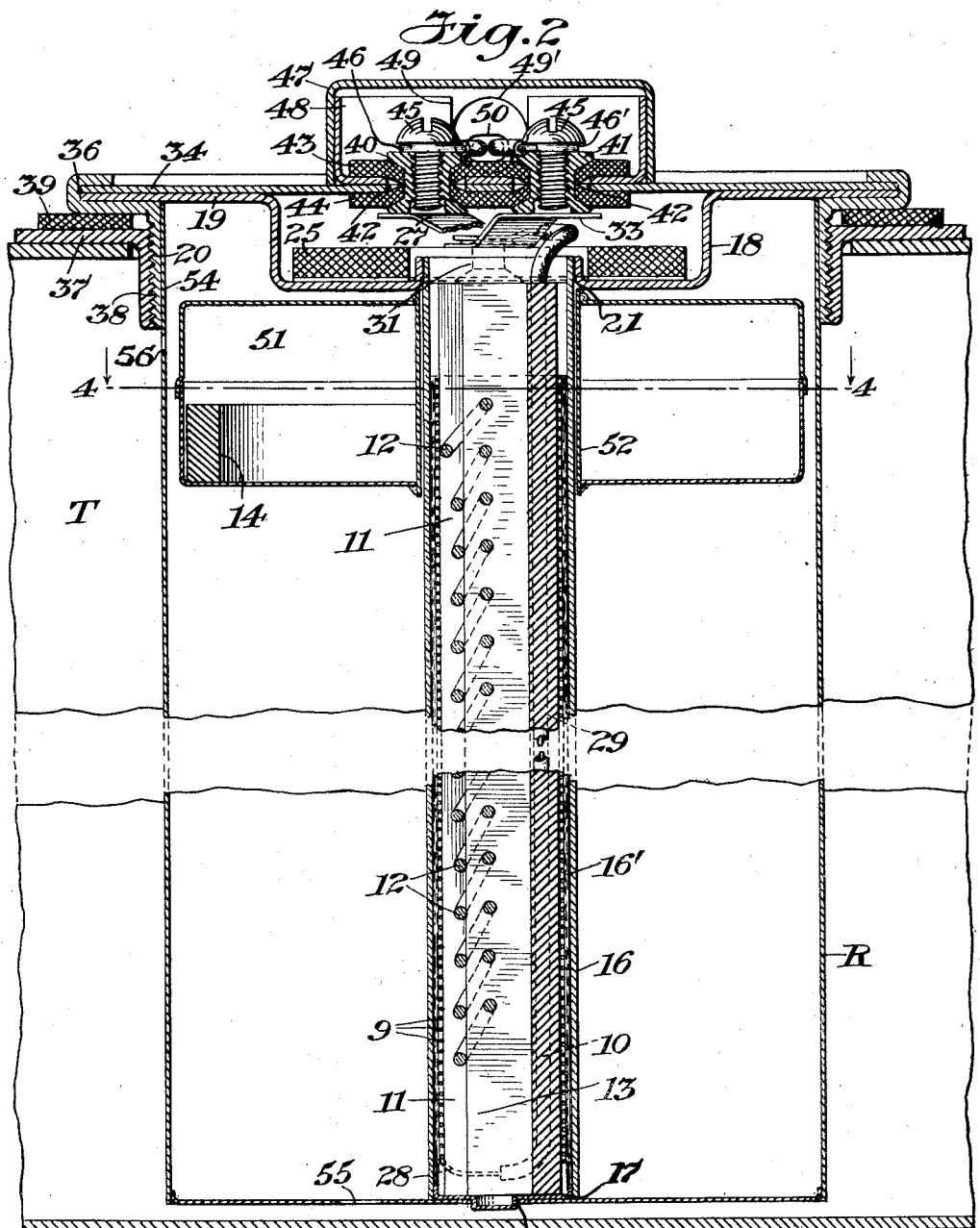
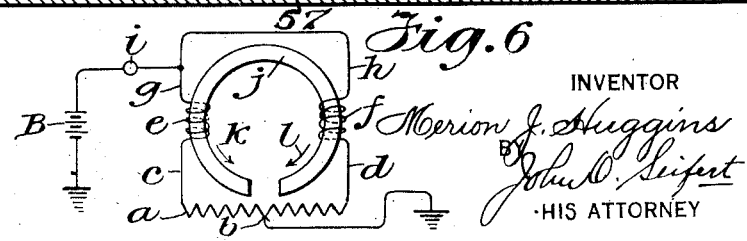
INVENTOR
Merion J. Huggins
BY John D. Seifert
HIS ATTORNEY Oct. 13, 1931.  M. J. HUGGINS  1,827,525
ELECTRIC LIQUID MEASURING AND INDICATING MEANS
Filed Sept. 11, 1926  4 Sheets-Sheet 3

INVENTOR
Merion J. Huggins
BY John O. Seifert
HIS ATTORNEY

Oct. 13, 1931.  M. J. HUGGINS  1,827,525
ELECTRIC LIQUID MEASURING AND INDICATING MEANS
Filed Sept. 11, 1926  4 Sheets-Sheet 4
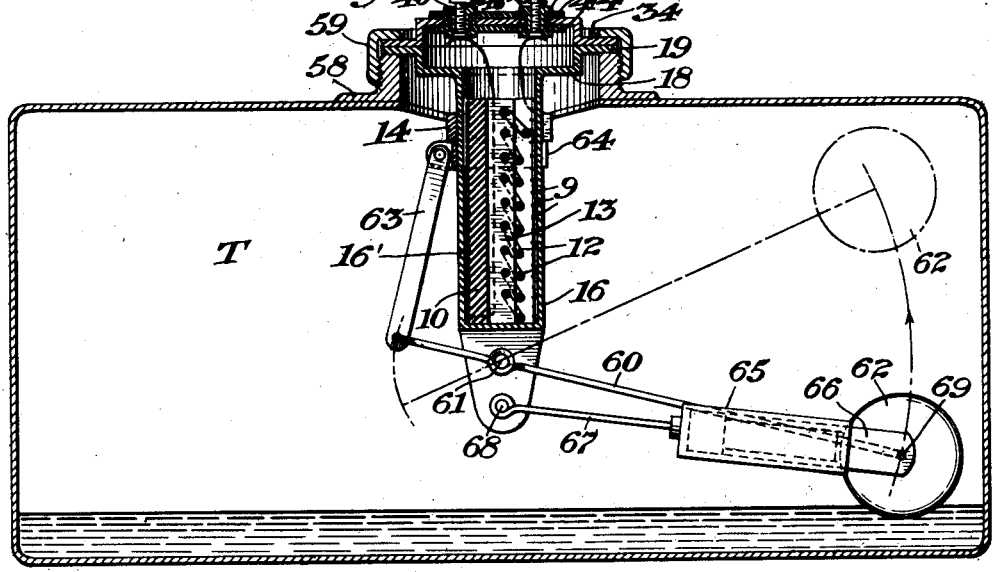
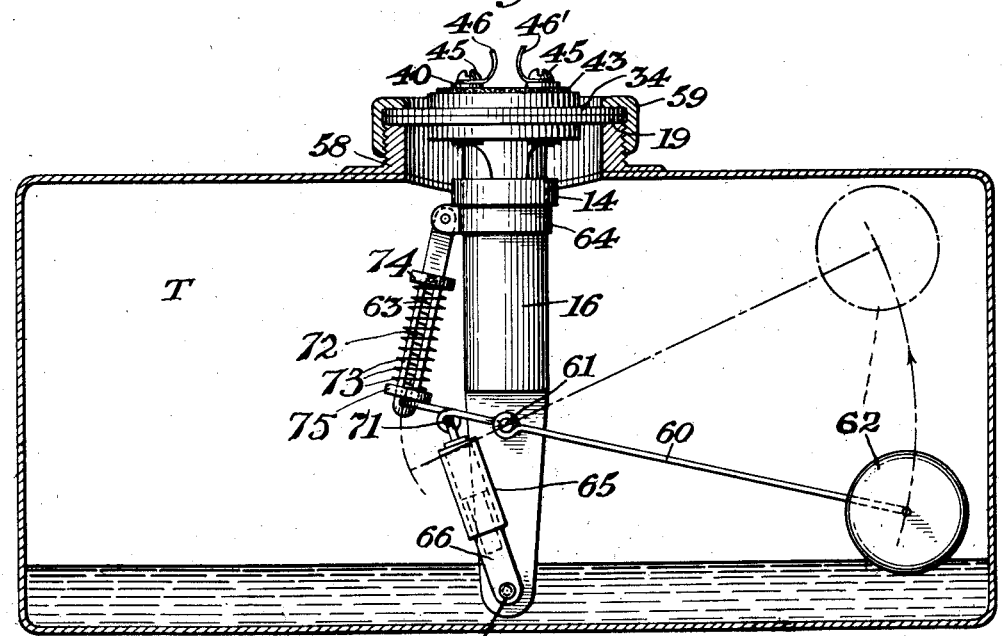
INVENTOR
Marion J. Huggins
BY
John O. Seifert
HIS ATTORNEY

UNITED STATES PATENT OFFICE

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE

ELECTRIC LIQUID MEASURING AND INDICATING MEANS

Application filed September 11, 1926. Serial No. 134,906.

This invention relates to electric current regulating means for use in connection with means to measure and indicate the quantity of liquid in a tank to control the actuation of an electric indicating instrument connected with said means in circuit with a source of electricity to indicate the quantity of liquid, such an instrument being disclosed in my co-pending application Serial No. 723,241 wherein an indicator is adapted to be variably positioned under the influence of a magnetic force or forces induced by an electric current flow, which forces are varied by and in accordance with variations in the current induced by introducing and cutting out resistance in the magnetic force generating means proportional to variations in the quantity of liquid in the tank and thereby indicating the quantity of liquid in the tank, the same being particularly adapted for use in connection with motor vehicles, for instance, to indicate the quantity of gasolene in the gasolene storage tank, and the introducing and cutting out of the resistance from the magnetic force generating means of the instrument actuating means being controlled by means which rises and falls with the liquid level in the tank, and it is the object of the present invention to provide an improved constructed and arranged current regulating device adapted to be mounted in a tank, which is simple and compact in structure and efficient in use.

A further object of the invention relates to the provision of a current regulating device for this purpose which is adapted to be mounted as a unitary structure in an opening in a tank, and to provide improved means for removably mounting the device in the tank isolated from the gasolene and its fumes and also from the atmosphere.

In carrying out the invention I provide a resistance coil with the terminals adapted for connection in an electric circuit and arrange in the coil in insulated relation thereto a series of spaced contact makers also adapted for connection in the circuit of the coil, and mount said coil in an enclosing housing of non-magnetizable but conducting material and either one of which contact makers is adapted to be moved into contact with the coil through the attraction thereof by a magnet movable along the housing to establish and connect different portions of the coil into one side of the circuit and cut out proportional amounts from the opposite side of the circuit, the magnet being moved along the housing through the movement of a float adapted to rise and fall with the liquid level in the tank, whereby variable amounts of the coil proportional to variations in the quantity of gasolene in the tank are connected into and cut out of the opposite sides of the circuit. In the use of the current regulating device for this purpose and controlled by the movement of the float the same will operate efficiently while the vehicle is not in motion. However, when the vehicle is in motion the gasolene is sloshed and surged about in the tank with the result that there are sudden changes in the liquid level in the tank and in which changes the position of the float will participate and a true reading as to the quantity of gasolene can not be obtained from the instrument.

It is a further object of the invention to provide means to check the movement of the float and prevent the same from participating in such sudden changes in the liquid level due to the surging of the liquid and maintain the float in a position which is substantially the mean liquid level in the tank.

In the drawings accompanying and forming a part of this specification Figure 1 is a longitudinal sectional view, on an enlarged scale, of an embodiment of my improved electric current regulating means and showing the same mounted in an opening in a tank containing the liquid to be measured, only so much of the tank being shown as is essential to an understanding of the invention.

Figure 2 is a longitudinal sectional view taken substantially centrally through Figure 1 and looking at the right thereof.

Figure 5 is a cross sectional view taken substantially on the line 5—5 of Figure 1 looking in the direction of the arrows.

Figure 6 is a view showing in a diagrammatic manner the electric hook up of the current regulating device with an electric indicating instrument.

Figure 7 is a longitudinal sectional view of my improved electric current regulating device showing the same mounted and suspended from an opening in a tank containing the liquid to be measured and showing a modified arrangement of the float actuated means for controlling the adjustment of the magnet along the enclosing housing with a modified arrangement of the means to dampen and check the movement of the float to prevent the same from participating in sudden changes in the liquid level in the tank; and Figure 8 is a side elevation of the arrangement shown in Figure 7 and a modified arrangement of the means to dampen and check the movement of the float.

Figure 3:
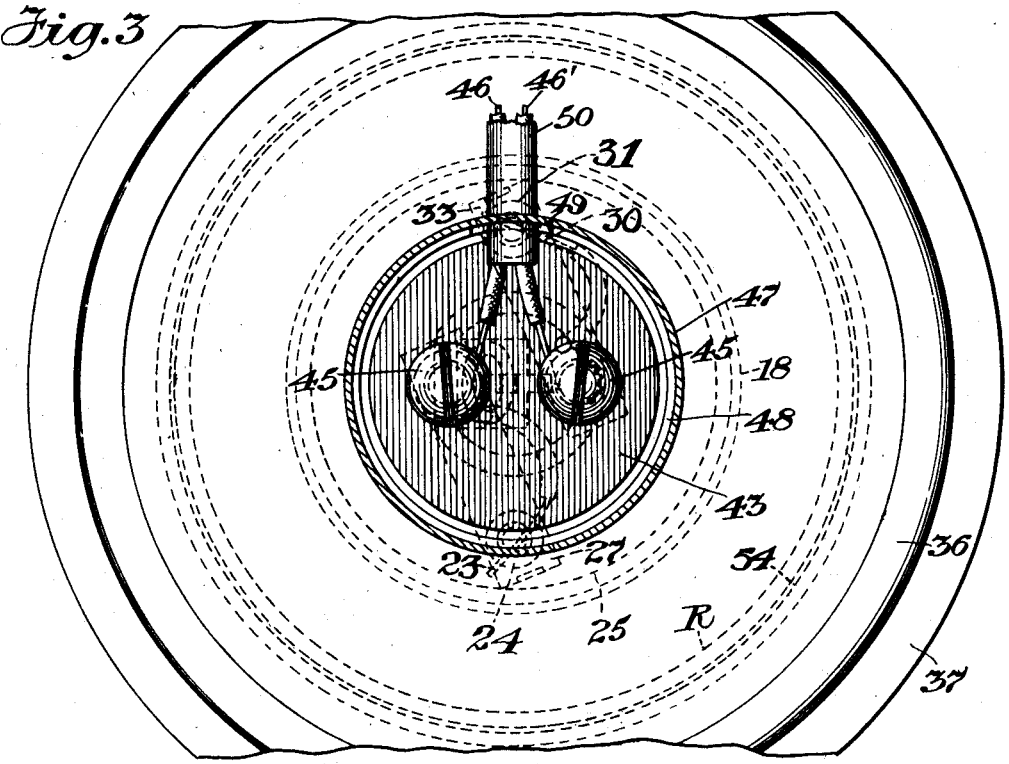
Figure 3 is a plan view partly in section and broken away looking at the top of Figure 2.
Figure 4:
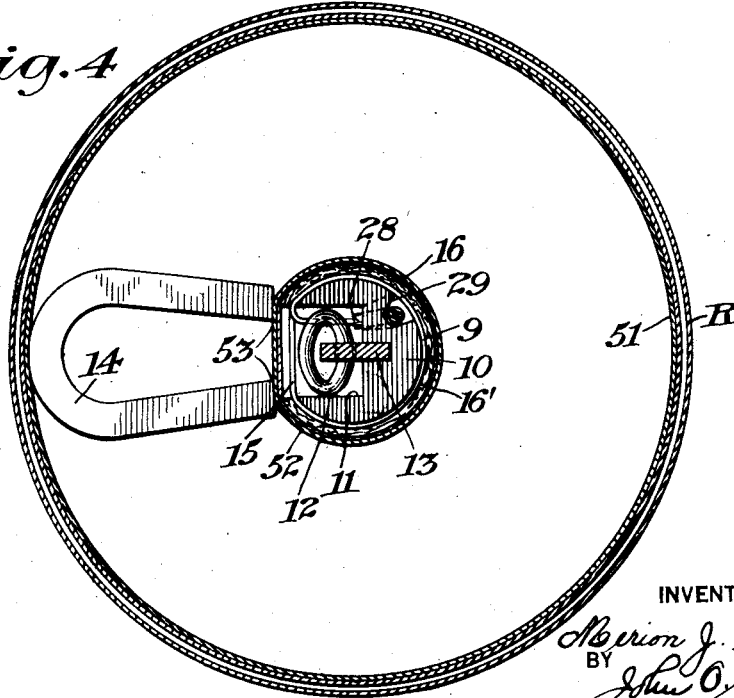
Figure 4 is a cross sectional view taken substantially on the line 4—4 of Figure 2 looking in the direction of the arrows.

In the embodiment of the invention shown in Figures 1 to 5 a coil 9 of wire of resistance material is wound about a bar 10 of insulator material, said rod or bar being arranged with a longitudinal recess 11 extending from end to end thereof. A series of equidistantly spaced contact makers 12 of magnetizable material and in the form of wire bent to ring or yoke form are movably mounted and electrically connected in the bar recess 11 with the coil 9 in enclosing relation thereto. In the present instance the contact makers are pivotally mounted at the ends in a bar 13 of conducting material and through which bar the contact makers are connected to a source of electricity, in motor vehicle practice a battery, by grounding said bar and one terminal of the battery in the vehicle frame. The terminals of the coil are adapted to be connected in circuit with and control the actuating means of an electric indicating instrument. The contact makers 12 normally assume a position by gravity out of contact with the coil as shown in Figure 2 and any one of said contact makers is adapted to be moved into contact with the coil 9 by a magnet 14 movable longitudinally of the coil, in a manner to be hereinafter described, to establish the circuit and connect variable amounts of the coil into one side of the circuit and cut out proportional amounts of the coil from the opposite side of the circuit. By the arranging of the recess in the insulator bar as the coil is wound thereon it is provided with a float portion extending across the open side of the recess, as shown at 15.

The insulator bar with the coil and contact makers is mounted and enclosed in a housing and whereby it is mounted in and suspended from an opening in the top of a tank T containing the liquid to be measured, which for illustrative and descriptive purposes may be assumed to be of rectangular shape in cross section, although it will be obvious that the application is applicable to and may be readily adapted for use in connection with tanks of other cross sectional shape. The housing comprises a tube 16 of electric conducting and non-magnetizable material having a closure 17 at the lower end, the carrier 13 for the contact makers being in electrical connection with said closure and through which closure and the tube it is grounded. Insulation 16' is interposed between the coil and the tube 16 with the exception of that portion where the coil extends across the open side of the recess 11. The upper end of the tube is open and at which end it is connected to supporting means which also serves as a closure for the opening from which it is suspended in the tank. This closure means comprises a plate arranged with a cupped portion 18 and the plate forming a flange 19 extending laterally from the cupped portion whereby it is supported upon a ring 20 of angular shape in cross section, the cupped portion having an axial opening with the marginal portion of the material about the opening flanged inwardly and in which the open end of the housing tube 16 is engaged and secured, as at 21, as by a driving fit and soldered or by screw threading. One terminal 22 of the coil 9 is extended through the bar recess 11, and electrically connected, as at 23, to a contact member in the form of an eyelet 24 mounted in a perforation in a ring 25 of insulator material seated in the cupped portion 18 to extend about the flanged opening in which the tube 16 is secured, the end of the eyelet contiguous to the closure member being countersunk to maintain the same out of contact and electrical connection with the closure member, as shown at 26. The eyelet also serves to mount a contact member 27 upon the insulator ring and in electrical connection with the eyelet for a purpose to be hereinafter described. The other terminal of the coil is extended through a recess in the lower end of the insulator bar 10, as shown at 28, in Figure 1, and then through a recess 29 extending longitudinally of the insulator bar, with insulation upon said portion of the coil terminal, and through the open end of the tube 16 into the cupped portion of the closure member where it is connected, as at 30, and an eyelet 31 mounted in the insulator ring 25 similar to the eyelet 24 with the one end 32 countersunk into the material of the ring for the purpose stated. The eyelet also serves to mount a contact member 33 upon the insulator ring in electrical connection with said eyelet for a purpose to be hereinafter described.

The open end of the cupped portion 18 of the closure member 19 is closed by a plate 34 to arrange said portion as an enclosed chamber in which the connections of the coil terminals are enclosed, and to close the end of the tube 16, to isolate the coil from the liquid in the tank in which it is suspended, or from fumes therefrom, and also from the atmosphere, and when used in connection with the gasolene tank of a motor vehicle to prevent ignition of the same by the creating of an arc by short circuiting or by the accumulation of foreign substance, or by the moving of the contact makers 12 into contact with the coil. The plate 34 is positioned relative to the closure plate 19 by arranging correspondingly formed offsets in both plates one for engagement in the other, as shown at 35, which will serve as a means to position the plates relative to each other. The tube closure members are secured in this position by flanging the ring 20 over the marginal portions of said members, as at 36. The ring 20 has screw threaded connection with a second ring 37 of angle form in cross section with a part engaged upon the tank about the opening and a part extending through the opening with which the ring 20 has screw threaded connection, as at 38, with a packing washer 39 interposed between the rings.

To connect the resistance coil 9 in an electric circuit exterior of its enclosing means, as in circuit with an indicating instrument, a pair of contact members in the nature of binding posts are mounted in and insulated from the plate 34, and comprise internally threaded eyelets 40, 41, engaged in openings 42 in the plate of greater diameter than the eyelets with plates of insulator material 43, 44 interposed between the heads of the eyelets and the plate 34, the openings in said insulator plates for the passage of the eyelets being substantially of the same diameter as the eyelets, and as the eyelets are upset to secure them in position the marginal portions about the openings in the insulator plates will be squeezed in interposed relation to the eyelets and the wall of the openings in plate 34 effectively insulating one from the other, as clearly shown in Figure 2. The contacts 27, 33 are arranged in contact with the eyelets 41. Screws 45 are threaded into the eyelets and electric conductors 46, 46' are connected to the eyelets and through the connection of said eyelets with the coil terminals by engaging said conductors between the screw heads and the eyelets. To prevent accumulation of foreign substances upon the binding posts and the possibility of short circuiting they are enclosed by a cap 47 having a slip joint connection with an open end cupped member 48 secured upon the closure plate 34 by the eyelets 40, 41, and the insulator plates 43, 44, said member having a recess 49 cut through the side wall with which a recess 49' cut into the wall of the cap 47 is adapted to be placed in register to provide an opening for the passage of the conductors 46, 46', or a cable in which they are enclosed, as shown at 50.

The device so suspended extends from the top of the tank to adjacent the bottom and the contact makers are moved into contact with the coils by the magnet 14 for the purpose stated, said magnet being preferably of the horse shoe type, and adapted to be positioned relative to the housing 16 in accordance with the liquid level in the tank by a float 51 which rises and falls with said liquid level. The float is of the hollow type having a core 52 of the same cross sectional form as the tube 16 and whereby the float is mounted upon said tube to have sliding movement along the same and held against rotation. The magnet 14 is mounted within the float with the pole pieces positioned relative to the flat portion of the float core and tube, as shown at 53, Figure 4, and as the magnet is positioned by the float opposite to a contact maker 12 it will be moved into contact with the coil through the attraction of the magnetic force of the magnet, as shown in Figure 2, where the uppermost contact maker is shown attracted by the magnet into contact with the coil.

To prevent sudden movement of the float with the magnet upon the tube when the device is used in connection with motor vehicles for measuring and indicating the quantity of gasolene in the gasolene tank by the float participating in sudden changes in the liquid level of the gasolene due to the sloshing and surging movement of the gasolene imparted thereto by the movement of the vehicle, and to maintain the float in a position which is substantially the mean level of the gasolene in the tank, the device with the float mounted thereon is arranged in a receptacle R, which is in the nature of an auxiliary tank, said receptacle being substantially of the same diameter as the float and open at the upper end where it is connected to the closure and suspending means, which also serves as a closure for the open end of the receptacle, by engaging the open end of the receptacle in the ring 20, as at 54. The receptacle R is in liquid communication with the tank T through a restricted port 55 in the bottom thereof for the slow flow of the liquid into and from said receptacle, the receptacle being also provided with a port 56 adjacent the top to relieve the receptacle of any air pressure above the float. The bottom of the receptacle is arranged with a central recess 57 for the engagement of a correspondingly formed projection on the closure 17 for the lower end of the housing 16 whereby to center said housing in the receptacle. By the arrangement described the receptacle R with the enclosed float and electric current regulating means may be engaged in the opening in the tank and removed therefrom as a unit for the purpose of repairs or the substitution of another unit.

In the embodiment of the invention illustrated in Figure 7 the enclosing housing 16 is in the form of a casting and constructed integral with the closure members 18, 19. Instead of connecting the terminals of the coil 9 with the contact members 33, 27 carried by the insulator ring 25, the terminals are connected directly with the contact members 40, 41 mounted in and insulated from the closure plate 34, said plate being arranged with a cupped portion in opposed relation to the cupped portion 18 of plate 19. Also instead of uniting said plates 18, 19 and 34 by flanging the ring 20 over the peripheral portions of said plates the plates are clamped between a collar 58 fixed to and extending about the opening in the tank by a flanged ring 59 having threaded connection with said collar and the flange engaging over the plates of the closure member.

The electric current regulating means does not extend from the top to the bottom of the tank, but is of a length to extend about one-half or slightly more than one-half of said distance, with a part of the housing 16 extending beyond the same serving as a pivotal support for the float carrier in the form of a rod 60 arranged with a loop intermediate its ends whereby it is mounted upon a pin extending laterally from the extended portion of the housing 16, as at 61, a float 62 of the hollow ball type being connected to one end of the rod, while the other end of the rod has a link connection 63 with a collar 64 slidably mounted upon the housing 16 below the magnet 14, the magnet being of the ring type extending around and slidably mounted upon the housing. It will be noted that when practically all of the liquid has been withdrawn from the tank the magnet will be at the top of the housing instead of at the bottom as in the arrangement shown in Figures 1 to 4, when all of the resistance will be connected into the circuit and the electrical hook up of the electric current regulating means with the indicating instrument is reversed from that shown in Figures 1 to 4. It will be obvious that as the float falls with the liquid level the magnet will be moved upward on the housing by the ring 64, and as the float rises and the collar is moved downward on the housing, the magnet will move downward by gravity, or if desired it may be attached to the collar and positively moved therewith.

To check the movement of the float and prevent the same from participating in sudden changes in the liquid level in the tank and thus maintain the float in a position which is substantially the mean liquid level in the tank, a checking and dampening means to the movement of the float is provided. This means comprises a cylinder 65 closed at one end and a plunger 66 also in the form of a cylinder closed at one end, and engaged with the open end in the other cylinder and one cylinder to have movement relative to the other. As shown the cylinder 65 is pivotally mounted at one end by a rod 67 upon a pin extending laterally from the housing extension, as at 68, while the plunger 66 is engaged in the cylinder 65 and pivotally connected to the float centrally thereof, as at 69. The pivotal support 68 of the cylinder 65 is eccentric to and below the pivotal support 61 of the float carrier with the result that the pivotal connection 69 of the plunger with the float will have a greater radius than the distance between the connection of the float with its carrier and the pivotal support of the latter with the result that when the float is in its uppermost position, shown in dot and dash lines, the plunger will be somewhat withdrawn from the cylinder, and should there be a surging of the liquid in the tank which would tend to suddenly lower the liquid level at the float end of the tank the tendency of the float to also participate in said change in the liquid level will be checked and retarded by the movement of the plunger into the cylinder, which will be resisted by the air in the cylinder or any liquid which may have seeped therein should the same be submerged in the liquid.

The construction and arrangement shown in Figure 8 is substantially the same as that disclosed in Figure 7 with the exception of the means for checking and preventing the sudden movement of the float. In this arrangement the housing projection is extended to adjacent the bottom of the tank and the plunger or piston 66 is pivotally connected thereto, as at 70, the cylinder 65 being pivotally connected to the float carrier 60 intermediate its pivot support 61 and connection with link 63, as at 71. The cylinder and plunger function in a manner substantially the same as the cylinder and plunger in the structure of Figure 7 to check and retard the sudden movement of the float. The float in the arrangements shown in Figures 7 and 8 are elongated relative to the diameter thereof and while the device in the arrangement shown in Figure 7 may be readily inserted as a unit through the tank opening, due to the connection 71 of the cylinder 65 with the float carrier 60 in Figure 8 with the float carrier having a fixed pivotal connection with the link 63 difficulty would be experienced in removing the device from the tank opening. To facilitate the removal the link 63 is arranged with an elongated slot 72 in which the bent end of the float carrier is arranged to have sliding movement, whereby the float carrier may be adjusted to extend in a direction longitudinally of the housing 16. The connection of the float carrier is yieldingly maintained at the lower end of said slot in order that the float carrier may function properly to adjust the magnet 14 through the rise and fall of the float by a spring 73 coiled about the link and confined between a collar 74 fixed on the link and a collar 75 slidable on the link and urged by the spring into engagement with the float carrier and the connection of the carrier at the lower end of the slot.

In Figure 6 I have illustrated in a diagrammatic manner the electrical hook up of my improved electric current regulating means with an electric indicating instrument and source of electricity, the resistance coil being indicated at $a$ and the contact makers with the magnet to attract and move the same into contact with the coil by the arrow $b$ and showing the same in a conventional manner as grounded. The terminals $c$, $d$ of the coil are connected with one terminal of a pair of coils $e$, $f$ embodied in the indicating instrument, the opposite terminals $g$, $h$ being connected with a battery, shown in a conventional manner at B connected with the contact makers by grounding, the instrument being in an open circuit with the battery which is adapted to be closed by a push button actuated switch $i$. The instrument coils $e$, $f$, are arranged to generate opposed magnetic forces which are adapted to act on a ring $j$ of polarized material to move it in a circular path, the force generated by the coil $e$ moving the ring in the direction of the arrow $k$, and the force generated by the coil $f$ moving the ring in the direction of the arrow $l$. The ring constitutes a part of the indicator means of the instrument which may be in the form of a disk or drum with calibrations thereon movable with the ring. By this arrangement as the magnet is moved along the enclosing housing 16 and a contact maker 12 is attracted to the coil a portion of the resistance coil, depending upon the position of the magnet, is cut out from one side of the circuit and one of the instrument coils, say the coil $e$, and simultaneously therewith a proportional amount of the resistance coil is connected into the other instrument coil $f$ whereby the magnetic force generated by one coil is increased and that generated by the other coil proportionally decreased. This increase and decrease of the magnetic forces generated by the instrument coils is also proportional to the variations in the quantity of liquid in the tank. In some instances the one instrument coil, for instance, the instrument coil $e$ may be connected directly with the battery as by grounding the terminal $c$ whereby the value of the magnetic force generated by said coil will be constant. In said case the one terminal $d$ of the coil $a$ is connected with the instrument coil $f$ while the other terminal $c$ is grounded and whereby the value of the magnetic force generated by said instrument coil will be varied relative to the value of the force generated by coil $e$ and thereby controlling the movement of the indicator ring $j$.

Having thus described my invention I claim:

1. In a rheostat device, a rod of insulating material having a recess extending longitudinally thereof, a coil of electric resistance wire wound around and bridging the recess in said rod, a conductor member mounted in the rod recess, and a series of contacts pivotally carried by said conductor member within the rod recess to have independent movement toward and make contact with the portion of the coil bridging the rod recess, and said contacts normally assuming a position by gravity out of contact with the coil.

2. In a rheostat device, a rod of insulating material having a recess extending longitudinally thereof, a coil of electric resistance wire wound about said rod and bridging the recess therein, a conductor member mounted in the rod recess, a series of contacts pivotally carried by and spaced longitudinally of said conductor member, said contacts being in electrical connection with the conductor member and adapted to have movement in a direction toward and make contact with the portion of the coil bridging the recess in the rod and normally assuming a position by gravity out of contact with the coil, and means movable longitudinally of the coil to attract the contacts independently to the coil to connect the coil in an electric circuit through any of said contacts.

3. In a float controlled rheostat device, a rod of insulator material having a longitudinal recess therein, a bar of conductor material mounted in the rod recess, a resistance coil wound about and bridging the recess in the rod and out of contact with the conductor bar, contacts of magnetizable material carried by said bar within the recess of the rod to have independent movement on axes transverse to the longitudinal axis of the bar and connected in series through the bar, said contacts being arranged in opposed relation to and normally assuming a position out of contact with the windings of the coil bridging the rod recess, a float movable longitudinally of the coil, and a magnet carried by the float operative to attract and move the contacts into contact with the coil.

4. In a rheostat device as claimed in claim 3, a tubular housing of electric conducting and non-magnetic material in which the coil and contact carrying rod is carried with the coil insulated from said housing and the contact carrying bar in electrical connection with said housing, and the magnet carrying float movable longitudinally of the housing.

5. In a quantity indicating device for liquid tanks, a rod of insulator material having a recess extending longitudinally thereof, a resistance coil wound about said rod in bridging relation to the recess, a conductor mounted in the rod recess, contacts of magnetizable material pivotally mounted on and connected in series through said conductor, said contacts being spaced longitudinally of the conductor in opposed relation to the coil windings bridging the rod recess and normally out of contact with the coil and adapted to have movement into contact with the coil, a tubular housing of electric conducting and non-magnetic material and open at one end carrying said coil and contact carrying rod, said housing being insulated from the coil and in electrical connection with said contact carrying conductor, means to which the housing is connected at the open end to suspend the same from an opening in the tank containing the liquid to be measured, said suspending means being arranged to serve as a closure for the tank opening and the open end of the housing, a float movable longitudinally of the housing, and a magnet carried by the float operative to attract and move the contacts into contact with the coil.

6. A quantity indicating device for liquid tanks as claimed in claim 5, wherein the means to mount the housing in the opening in the tank comprises a cupped member having a laterally extending flange and in the bottom of which member the housing is secured at the open end and opening thereto, a cover plate for the opening to and arranging the cupped member with an enclosed chamber, a ring flanged over the peripheral portions of the cover plate and flange of the cupped member to secure the same together, said ring being adapted for mounting in the tank opening, contact terminals carried by and insulated from the cover plate arranged for connection of electric conductors, and means within the cupped member in electrical connection with the contact terminals carried by the cover plate to which the terminals of the coil are electrically connected.

7. A quantity indicating device for liquid tanks as claimed in claim 5, wherein the means to mount the housing in the opening in the tank comprises a cupped member having a laterally extending flange and in which the housing is mounted at the open end and opening thereto, a cover plate for closing the opening to and providing a closed chamber in the cupped member, a ring flanged about the peripheral portions of the cover plate and flange of the cupped member to secure the same together and adapted for mounting in the tank opening, tubular contact terminals mounted in and insulated from the cover plate, screws threaded into said contact terminals for connecting electric conductors to said terminals, contact terminals to which the terminals of the coil are connected, a carrier of insulator material for said latter contact terminals within the chamber, and yielding contact members electrically connected with the latter contact terminals and in electrical connection with the contact terminals carried by the cover plate.

8. In a quantity indicating device for liquid tanks, a bar of insulator material having a longitudinally extending recess therein, contacts of magnetizable material, means carried by the bar within the bar recess upon which the contacts are pivotally carried and electrically connected in series, a coil of resistance material wound about the insulator bar in enclosing relation to the contacts within the bar recess and with which coil the contacts are adapted to make contact, a tubular member of conducting and non-magnetizable material closed at one end in which the coil and contact carrying insulator bar is mounted, insulation interposed between the tubular member and coil, means to which the tubular member is connected at the open end to serve as a closure for said open end of the tubular member and a mounting for suspending the tubular member from an opening in the tank, a float slidably mounted on the tubular member, a magnet carried by the float operative to attract the contacts to the coil, and a receptacle connected to the closure and mounting means for the tubular member to enclose the tubular member with the float mounted thereon and having a restricted port for the passage of liquid to the tubular member from the tank and from the tubular member to the tank.

Signed at the city of New York, in the county of New York and State of New York, this 19th day of February, 1926.

MERION J. HUGGINS.